US008026650B2

(12) United States Patent  
Ramadass et al.

(10) Patent No.: US 8,026,650 B2
(45) Date of Patent: Sep. 27, 2011

(54) CIRCUIT AND METHOD TO IMPROVE ENERGY HARVESTING EFFICIENCY IN PIEZOELECTRIC HARVESTERS

(75) Inventors: Yogesh Ramadass, Cambridge, MA (US); Anantha Chnadrakasan, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 33 days.

(21) Appl. No.: 12/558,820

(22) Filed: Sep. 14, 2009

(65) Prior Publication Data
US 2010/0079034 A1     Apr. 1, 2010

Related U.S. Application Data

(60) Provisional application No. 61/098,873, filed on Sep. 22, 2008.

(51) Int. Cl.
*H01L 41/113* (2006.01)
(52) U.S. Cl. .......................... 310/318; 310/319
(58) Field of Classification Search ............ 310/318, 310/319
See application file for complete search history.

(56) References Cited

U.S. PATENT DOCUMENTS

| 3,878,408 | A * | 4/1975 | Nemoto ............ 310/318 |
| 6,522,048 | B1 * | 2/2003 | Burns et al. ............ 310/316.01 |
| 6,528,928 | B1 * | 3/2003 | Burns et al. ............ 310/339 |
| 7,550,873 | B2 * | 6/2009 | Jiang et al. ............ 307/64 |
| 2003/0057778 | A1 * | 3/2003 | Ai ............ 307/64 |
| 2003/0209063 | A1 | 11/2003 | Adamson et al. |
| 2005/0285728 | A1 | 12/2005 | Tyndall |
| 2010/0194239 | A1 * | 8/2010 | Mehraeen et al. ............ 310/319 |

FOREIGN PATENT DOCUMENTS

| JP | 07-245970 | 9/1995 |
| WO | 2006-109037 | 10/2006 |

OTHER PUBLICATIONS

Leland et al., "Inproving Power Output for Vibration-Based Energy Scavengers" IEEE CS and IEEE ComSoc, Pervasive Computing, Jan. to Mar. 2005, pp. 28-36.
Le et al., "Piezoelectric Micro-Power Generation Interface Circuits" IEEE Journal of Solid State Circuits, vol. 41, No. 6, Jun. 2006, pp. 1411-1420.
Ottman et al., "Adaptive Piezoelectric Energy Harvesting Circuit for Wireless Remote Supply" IEEE Transactions on Power Electronic, vol. 17, No. 5, Sep. 2002, pp. 669-676.
Lallart et al., "An optimized self-powered switching circuit for non-linear energy harvesting with low voltage output" Smart Materials and Structures, IOP Publishing, May 6, 2008, pp. 1-8.

* cited by examiner

*Primary Examiner* — Thomas M Dougherty
(74) *Attorney, Agent, or Firm* — Gesmer Updegrove LLP

(57) ABSTRACT

An energy harvester circuit is provided. The energy harvester circuit includes a harvesting module for extracting energy from an ambient source. A bias flip module manages the manner in which voltage across the harvesting module transitions when input current from the harvesting module changes direction so as to allow a majority of the charge available from the harvesting module to be extracted. A voltage transitioning module is shared amongst one or more DC-DC converters for efficient energy management.

16 Claims, 9 Drawing Sheets

CIRCUIT AND METHOD TO IMPROVE ENERGY HARVESTING EFFICIENCY IN PIEZOELECTRIC HARVESTERS

PRIORITY INFORMATION

This application claims priority from provisional application Ser. No. 61/098,873 filed Sep. 22, 2008, which is incorporated herein by reference in its entirety.

SPONSORSHIP INFORMATION

This invention was made with governmental support under Grant Number W15P7T-08-C-P408, awarded by the US Air Force. The government has certain rights in the invention.

BACKGROUND OF THE INVENTION

The invention is related to the field of energy harvesting, and in particular to improving energy harvesting efficiency of piezoelectric harvesters.

Energy harvesting is an area of growing importance to reduce the dependence of handheld, portable and implantable electronics on batteries. Harvesting ambient vibration energy through piezoelectric means is a popular energy harvesting technique which can supply 100's of μW of available power. A piezoelectric element converts mechanical energy in the form of vibrations into electrical energy and vice-versa. It can be modeled as a current source in parallel with a complex impedance.

Ambient mechanical vibrations produce an AC current in the piezoelectric element which must be rectified to get a DC voltage output. Conventional rectifiers use a full-bridge rectifier 2 or a voltage doubler 10 circuit as shown in FIGS. 1 and 2. The problem with a simple full-bridge strategy is that most of the available power of the harvester 4 is just wasted in charging and discharging the input capacitor.

A piezoelectric harvester is usually represented electrically as a current source in parallel with a capacitor ($C_P$) and resistor ($R_P$). The current source provides current proportional to the input vibration amplitude. For the sake of the following analysis, the input vibrations are assumed to be sinusoidal in nature and hence the current is represented as:

$$I_{HAR} = I_p \sin \omega t \quad (1)$$

Some of the prior art in extracting electrical power from piezoelectric harvesters 2, 10 is shown in FIGS. 1 and 2. FIG. 1 shows a full-bridge rectifier and FIG. 2 shows a rectifier 10 which also acts as a voltage doubler. The analysis also assumes ideal diodes 6, 14. The electrical power that is extractable from the full-bridge rectifier using the circuit shown in FIG. 1 is given by:

$$P_{RECT} = \frac{2V_{RECT}}{\pi}(I_p - V_{RECT}\omega C_p) \quad (2)$$

where $V_{RECT}$ is the rectified output voltage of the full-bridge rectifier 2. The extracted power varies with the output voltage and reaches a maximum at $$V_{RECT,max} = \frac{I_p}{2\omega C_p} \quad (3)$$

where the maximum power extractable is $$P_{RECT,max} = \frac{I_p^2}{2\pi\omega C_p} \quad (4)$$

For the voltage doubler case, while the maximum power extractable remains the same, the output voltage ($V_{RECT}$) at which this is achieved is twice the value as given by eq. (3).

The main limitation of the full-bridge rectifier 2 is that, most of the current available from the harvester 4 does not go into the output at high voltages. This is because, the current first has to go into the capacitor $C_p$ to charge it up to $V_{RECT}$ before the current can go into the output. This happens every time current changes direction from positive to negative and vice-versa. In each of those occasions, the voltage across $C_p$ has to change from $+V_{RECT}$ to $-V_{RECT}$ or from $-V_{RECT}$ to $+V_{RECT}$. This loss in charge due to charging and discharging of $C_p$ limits the maximum power that can be extracted using the full-bridge rectifier.

Following the rectifier, additional DC-DC converters are required to regulate the output of the rectifier to its maximum power point and to efficiently transfer the energy obtained to the load circuits. These converters can be inductor-based to achieve high efficiency.

SUMMARY OF THE INVENTION

According to one aspect of the invention, there is provided an energy harvester circuit. The energy harvester circuit includes a harvesting module for extracting energy from an ambient source. A bias flip module manages the manner in which voltage across the harvesting module transitions when input current to the harvesting module changes direction so as to allow a majority of the charge available from the harvesting module to be extracted. A voltage transitioning module is shared amongst one or more DC-DC converters for efficient energy management.

According to another aspect of the invention, there is provided a method of performing energy harvesting. The method includes providing a harvesting module for extracting energy from an ambient source. Also, the method includes implementing a bias flip module to manage the manner in which voltage across the harvesting module transitions when input current to the harvesting module changes direction so as to allow a majority of the charge available from the harvesting module to be extracted. Furthermore, the method includes implementing a voltage transitioning module that is shared amongst one or more DC-DC converters for efficiency energy management.

DETAILED DESCRIPTION OF THE INVENTION

The invention provides a circuit technique to improve the energy harvesting efficiency of piezoelectric harvesters. The circuit uses a bias-flip rectifier technique which improves multi-fold, the power extraction capability as compared to conventional full-bridge rectifiers and voltage doublers. The bias-flip rectifier uses an inductor which can be shared with a multiplicity of DC-DC converters on the same energy processing circuit through an arbiter which controls access to the inductor. The circuit can be used in energy harvesting scenarios as a battery life-time enhancer or to completely eliminate the battery altogether. The invention is not limited to piezoelectric harvesters and can be used in general with any input having similar electrical characteristics to a piezoelectric harvester.

Figure 1:
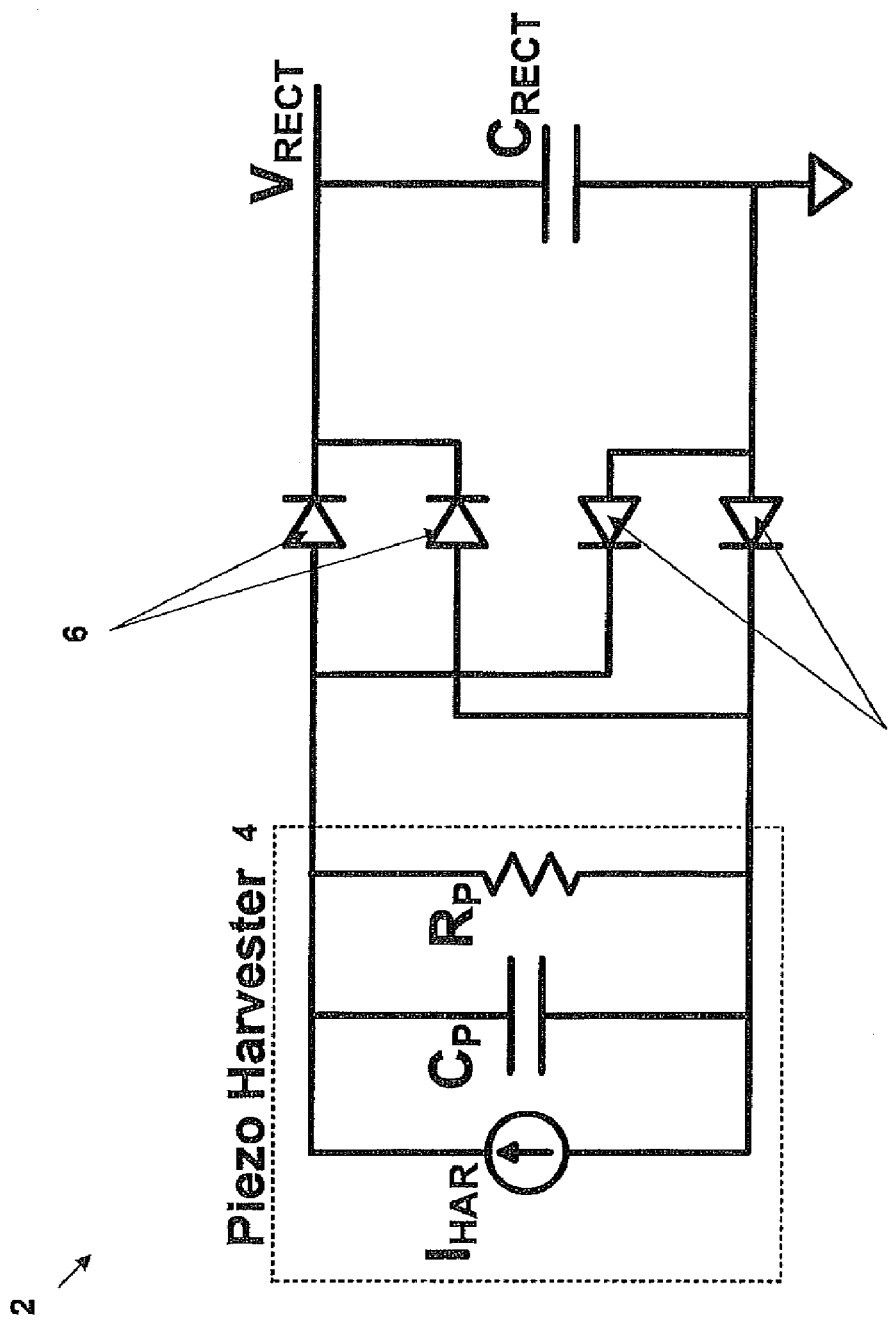
FIG. 1 is a circuit diagram illustrating a full-bridge rectifier.
Figure 2:
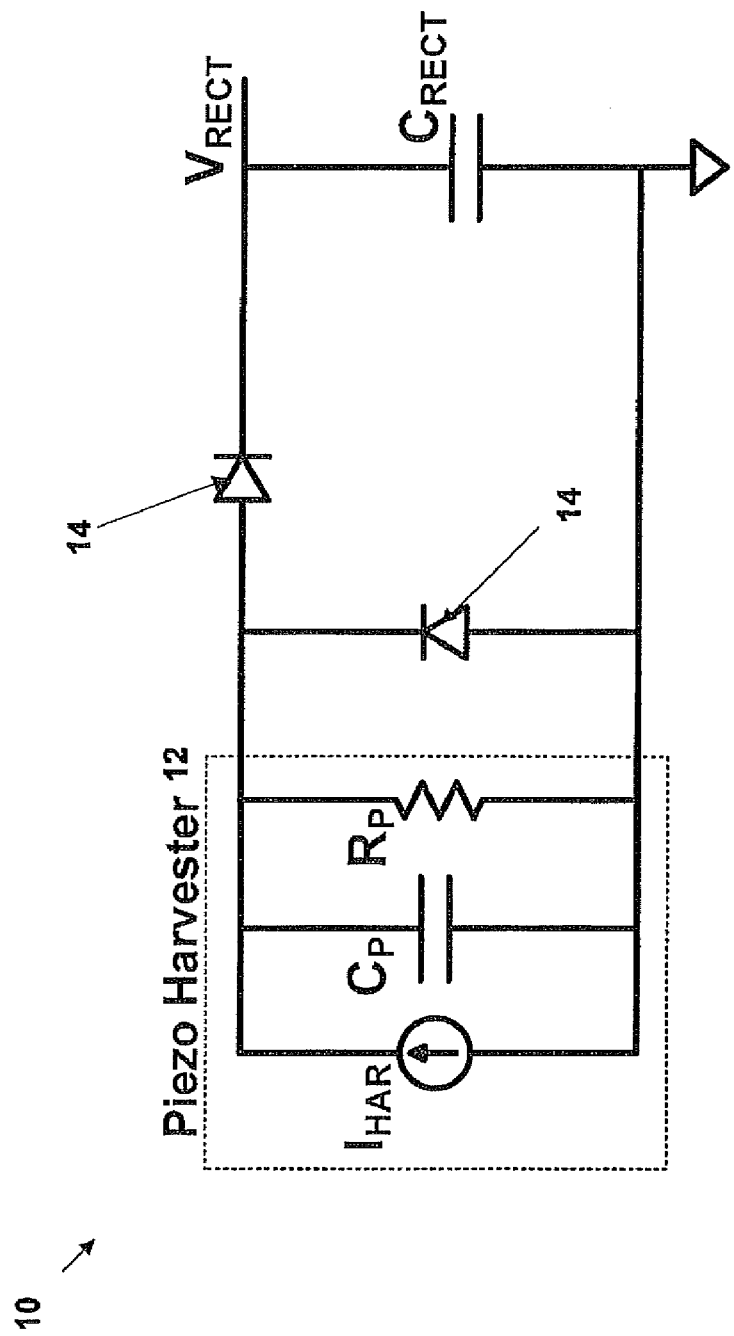
FIG. 2 is a circuit diagram illustrating a voltage doubler rectifier.
Figure 3:
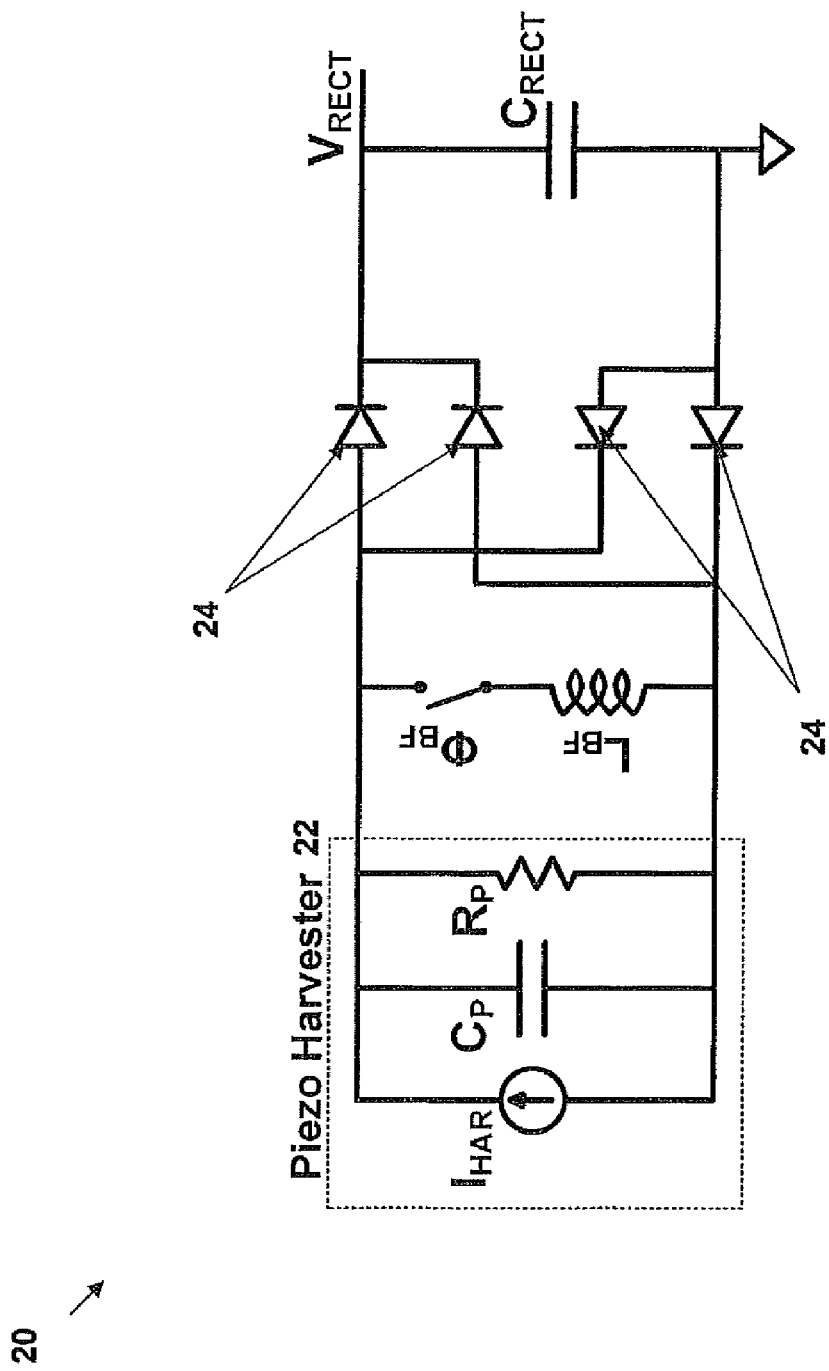
FIG. 3 is a circuit diagram illustrating a bias-flip rectifier.

FIG. 3 shows a schematic of an exemplary embodiment of the bias-flip rectifier circuit 20 in accordance with the invention. The circuit 20 includes a regular full-bridge rectifier, having the diode arrangement 24, with the addition of an inductor ($L_{BF}$) and a switch $\Phi_{BF}$.

The inductor ($L_{BF}$) operates by flipping in a very efficient manner using the switch $\Phi_{BF}$, the voltage across $C_p$ from $+V_{RECT}$ to $-V_{RECT}$ and vice-versa when the input current changes direction. This way the majority of the charge available from the harvester 22 can go into the output capacitor ($C_{REF}$) without having to charge and discharge $C_p$.

All practical piezoelectric harvesters have a parallel resistance $R_p$. This resistance limits the maximum power achievable. From maximum power transfer theory, this maximum power limit is, $$P_{RECT,max\_the} = \frac{I_p^2 R_p}{8} \tag{6}$$

In the presence of the resistor $R_p$, the power available from a full-bridge rectifier is limited to $$P_{RECT,BR} \approx \frac{2V_{RECT}}{\pi}\left(I_p - V_{RECT}\omega C_p - \frac{\pi V_{RECT}}{2R_p}\right) \tag{7}$$

which can be re-written as, $$P_{RECT,BR} \approx \frac{2V_{RECT}}{\pi}(I_p - V_{RECT}\omega C_p(1+\pi/2Q)) \tag{8}$$

where $Q=\omega R_p C_p$, is the quality factor of the input piezoelectric harvester. This leads to maximum extractable power of, $$P_{RECT,max\_BR} = \frac{I_p^2}{2\pi\omega C_p(1+\pi/2Q)} \tag{9}$$

For the bias-flip rectifier 20 of FIG. 3, the presence of $R_p$ limits the power extractable to $$P_{RECT,BF} \approx \frac{2V_{RECT}}{\pi}\left(I_p - \frac{\pi\omega C_p V_{RECT}}{2Q}\right) \tag{10}$$

which reaches a maximum of $$P_{RECT,max\_BF} = \frac{I_p^2 Q}{\pi^2 \omega C_p} \tag{11}$$

It can be thus seen that, the bias-flip rectifier improves upon the maximum power extractable by a factor of $$\frac{P_{RECT,max\_BF}}{P_{RECT,max\_BR}} = \left(1 + \frac{2Q}{\pi}\right) \tag{12}$$

For a commercial piezoelectric harvester with a Q of 12.8, the bias-flip rectifier 20 can theoretically provide an improvement of 9.15× in extractable power. However, the parasitic resistances associated with inductive charge transfer and the overhead power involved in controlling the bias-flip rectifier circuitry limit the improvement of the extractable power to 6-8×.

The ratio of the power extractable by the bias-flip rectifier 20 compared to the maximum power extractable as predicted by the maximum power transfer theory is given by, $$\frac{P_{RECT,max\_BF}}{P_{RECT,max\_the}} = \frac{8}{\pi^2} = 0.81 \tag{13}$$

Figure 4:
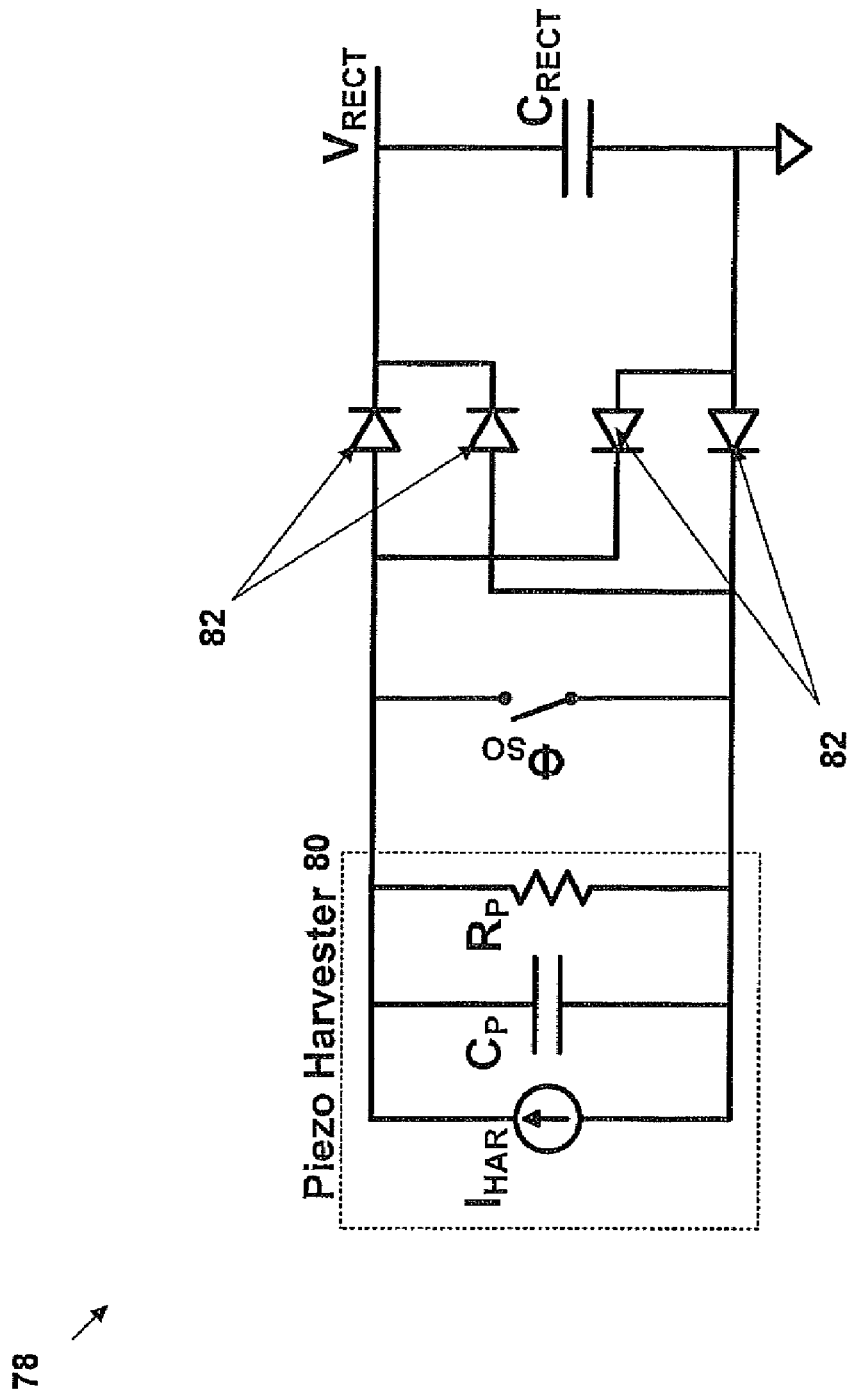
FIG. 4 is a circuit diagram illustrating a switch-only rectifier

In systems where it is prohibitive to use an inductor to improve power output or when the series resistance of the piezoelectric harvester is high, a switch-only rectifier scheme can be used. FIG. 4 shows a schematic of an exemplary embodiment of the switch-only rectifier circuit 78 in accordance with the invention. The circuit 78 includes a regular full-bridge rectifier, having the diode arrangement 82, with the addition of a switch $\Phi_{SO}$.

The switch $\Phi_{SO}$ helps in discharging the voltage across $C_p$ from $\pm V_{RECT}$ to ground when the input current changes direction. This way the charge lost in the full-bridge and voltage doubler cases can be reduced by half. This helps in increasing the power output from the harvester 80 by 2× compared to a full-bridge rectifier or voltage doubler.

Figure 5:
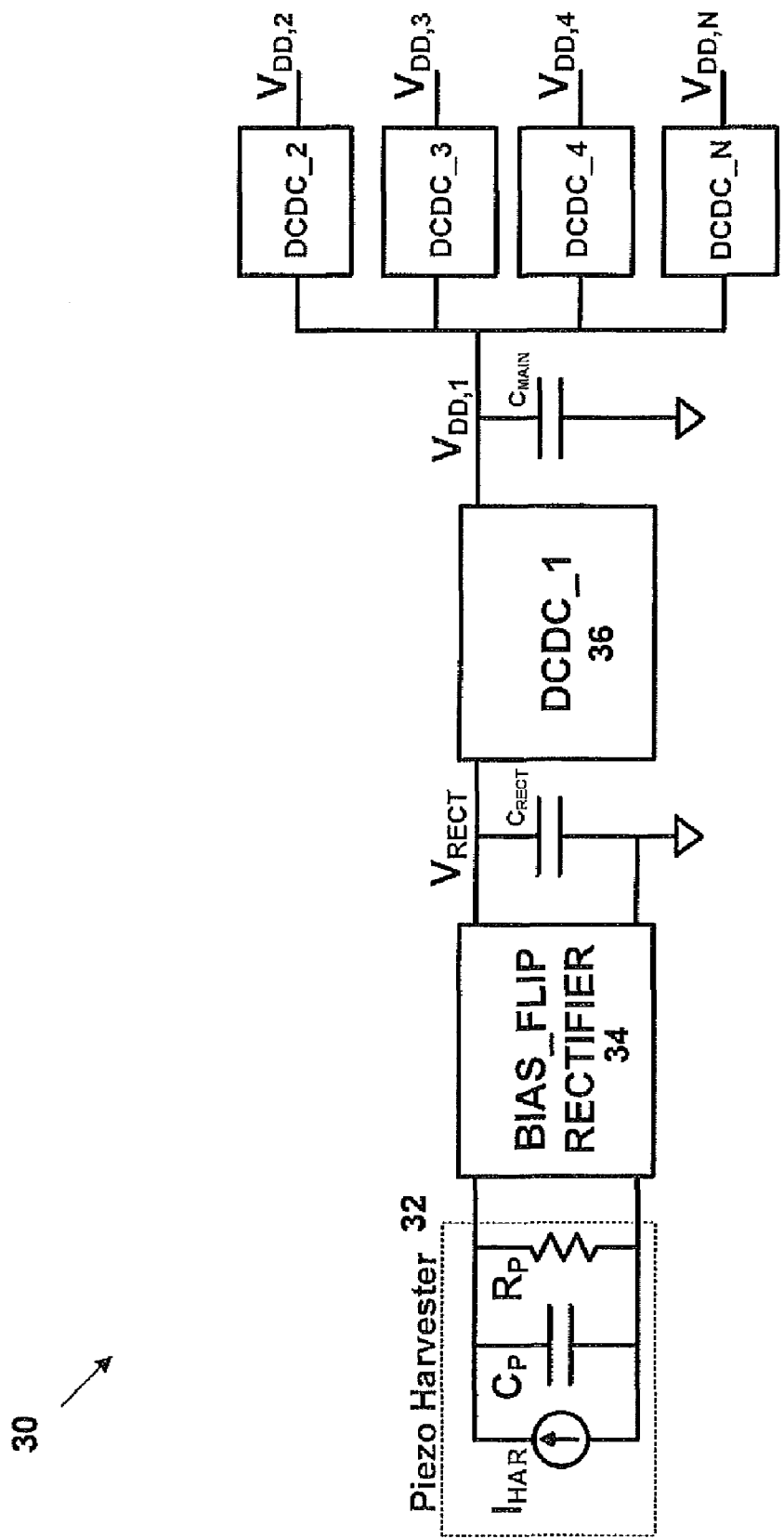
FIG. 5 is a circuit diagram illustrating a full DC-DC converter system.

FIG. 5 shows an exemplary circuit architecture 30 which uses a bias-flip rectifier 34. The output of the rectifier 34 is fed to a main DC-DC converter 36 whose output $V_{DD,1}$ is an energy buffer. The energy buffer can be a battery or a large storage capacitor $C_{MAIN}$. This output $V_{DD,1}$ can then feed a multiplicity of DC-DC converters DCDC_2-DCDC_N each of which can cater to its own load circuitry $V_{DD,2}$-$V_{DD,N}$. Depending on the system being built, there can be many different DC-DC converters (buck/boost) DCDC_2-DCDC_N downstream or the system 30 might just have the main DC-DC converter 36. These DC-DC converters will themselves employ inductors.

The bias-flip rectifier can help improve the power extracted from piezoelectric harvesters by 6-8×. However, it requires the use of an inductor. In the proposed implementation here, this inductor can be the same one used in the many different DC-DC converters present in the system using the arbiter as shown in FIG. 5.

Figure 6:
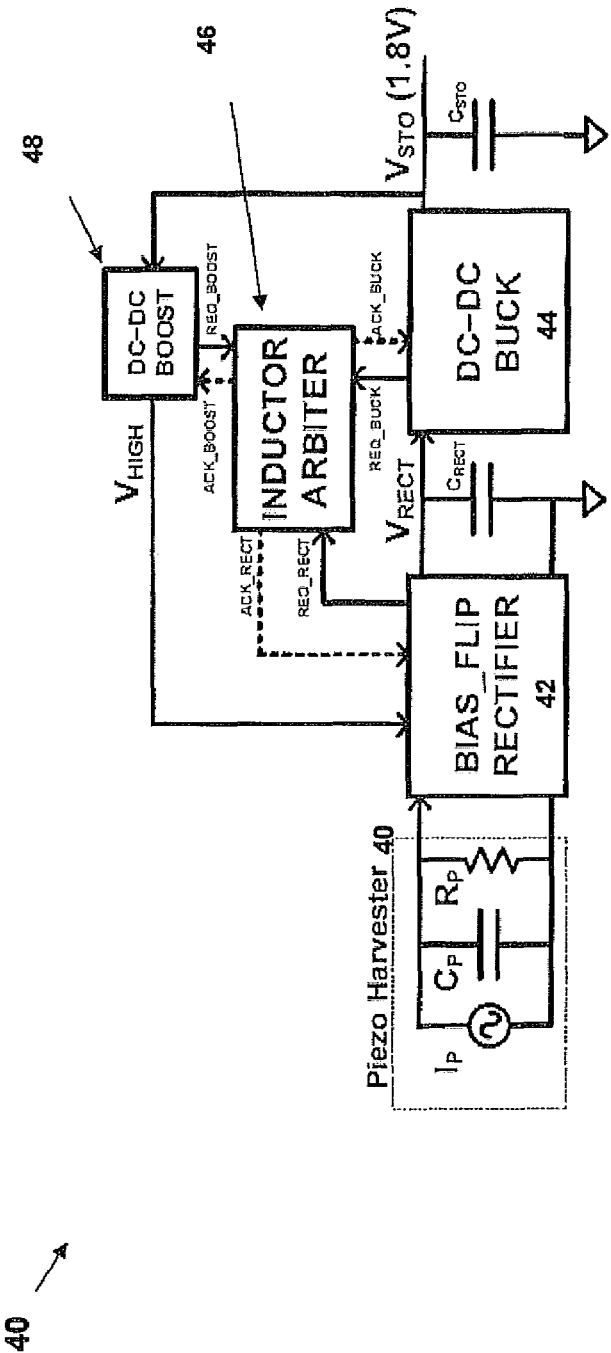
FIG. 6 is a circuit diagram illustrating a buck/boost DC-DC converter.
Figure 7:
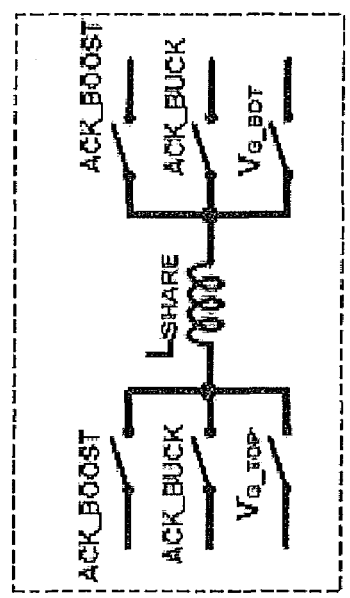
FIG. 7 is a schematic diagram illustrating an inductor sharing scheme implemented using an arbiter used in accordance with the invention.

FIG. 6 shows a circuit architecture 40 with a bias-flip rectifier system 42. The output voltage of the rectifier $V_{RECT}$ needs to be regulated at its optimum point for maximal power transfer. A buck DC-DC converter 44 is used to regulate $V_{RECT}$ and efficiently pass on the energy $V_{STO}$ obtained to a storage capacitor $C_{STO}$ or a rechargeable battery. A boost DC-DC converter 48 is used to generate a high voltage $V_{HIGH}$ (~5V) which is used to power the switches of the bias-flip rectifier 42. Both the buck and boost DC-DC converters 44, 48 employ an inductor-based architecture for improved efficiency. The arbiter block 46 is used to control access to the shared inductor ($L_{SHARE}$) which is shared between the bias-flip rectifier 42, buck and boost DC-DC converters 44, 48, as shown in FIG. 7.

Thus, effectively, the inductor ($L_{SHARE}$) can be time shared between the rectifier 42 and the many different DC-DC converters 44, 46. This is done with the help of the arbiter block 46 as shown in more detail in FIG. 6. The arbiter receives requests (ACK_RECT, REQ-RECT, ACK_BUCK, REQ_BUCK, ACK_BOOST, REQ_BOOST) for usage of the inductor ($L_{SHARE}$) from the rectifier 42 and the different DC-DC converters 44, 48. It then allocates the inductor ($L_{SHARE}$) to the requestor if the inductor ($L_{SHARE}$) is unoccupied or enters the request into a queue if the inductor ($L_{SHARE}$) is occupied. The inductor ($L_{SHARE}$) can be allocated to the different requestors using a FIFO approach or based on a priority scheme as needed. This inductor ($L_{SHARE}$) sharing approach requires the use of only one inductor for the entire system thereby minimizing area, volume and cost.

Figure 8:
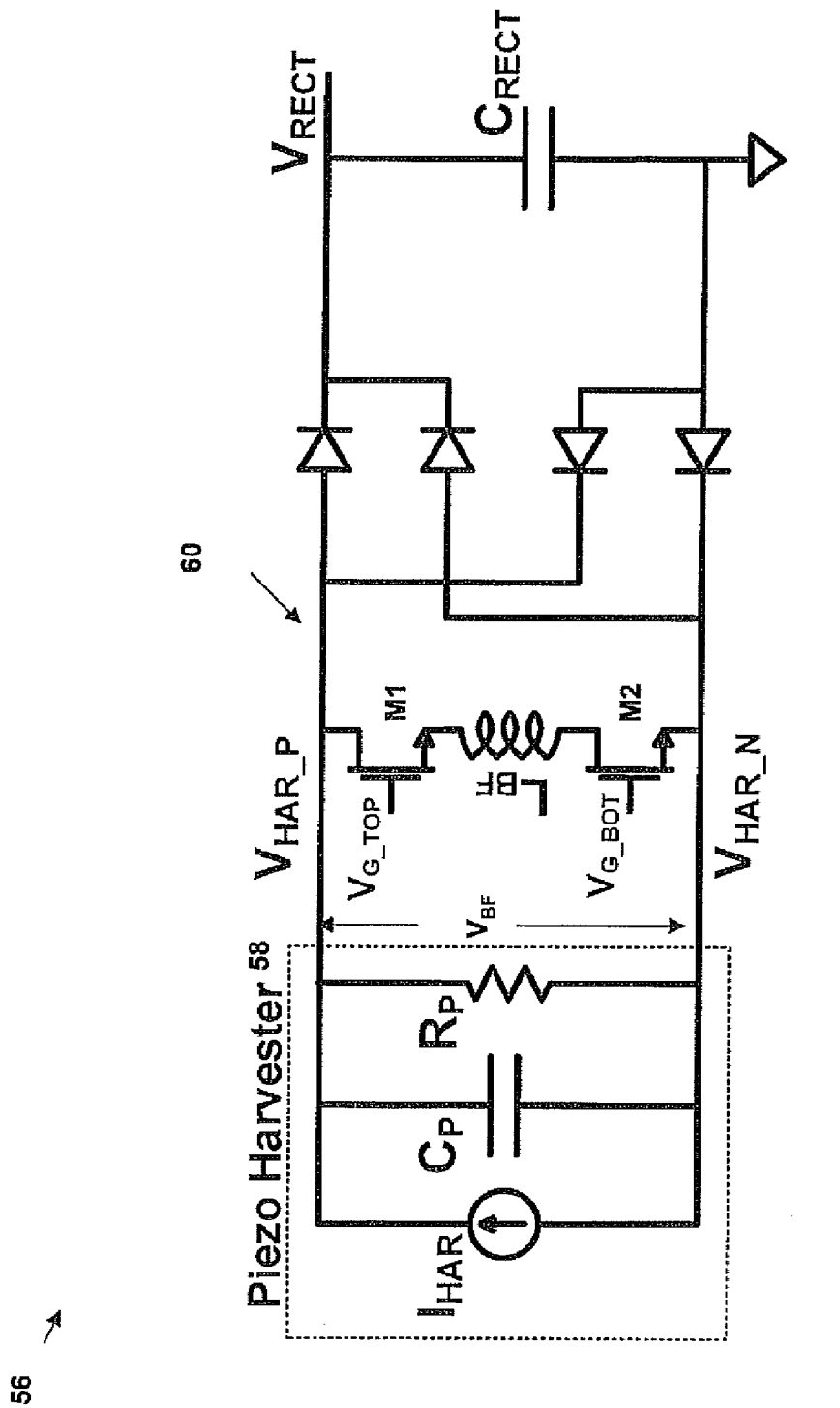
FIG. 8 is a circuit diagram illustrating an inductor bias-flip rectifier shown with the bias-flip switches.

FIG. 8 shows an exemplary circuit architecture 56 including a bias-flip rectifier 60 having an inductor $L_{BF}$ that is connected in parallel with the PE harvester 58. The switches M1 and M2 are turned ON for a brief time when the PE current $I_P$ crosses zero in either direction. When the switches M1 and M2 are ON, the inductor $L_{BF}$ helps in flipping the voltage $V_{BF}$ across $C_P$. The series resistance along the $L_{BF}C_P$ resonant path limits the magnitude of this voltage inversion. After the switches close, the PE current $I_P$ needs to supply a smaller amount of charge to $C_P$ to bring it up to $\pm V_{RECT}$. This significantly improves the power extractable from the harvester 58. The output power that can be obtained with the bias-flip rectifier can be given by Eq. 10.

The bias-flip switches M1 and M2 are turned ON when the current from the harvester 58 crosses zero. At this point one of the voltages $V_{HAR\_P}$ or $V_{HAR\_N}$ is close to $V_{RECT}$ and the other one is close to zero. Let the maximum gate overdrive allowed by the technology in use be $V_{HIGH}$. For most efficient charge transfer through the inductor $L_{BF}$, the gate overdrive of the bias-flip switches M1 and M2 needs to be $V_{HIGH}$. The gate-drive circuitry shown in FIGS. 9A-9B accomplishes this while maintaining the bias-flip switches M1 and M2 within breakdown limits.

Figure 9A:
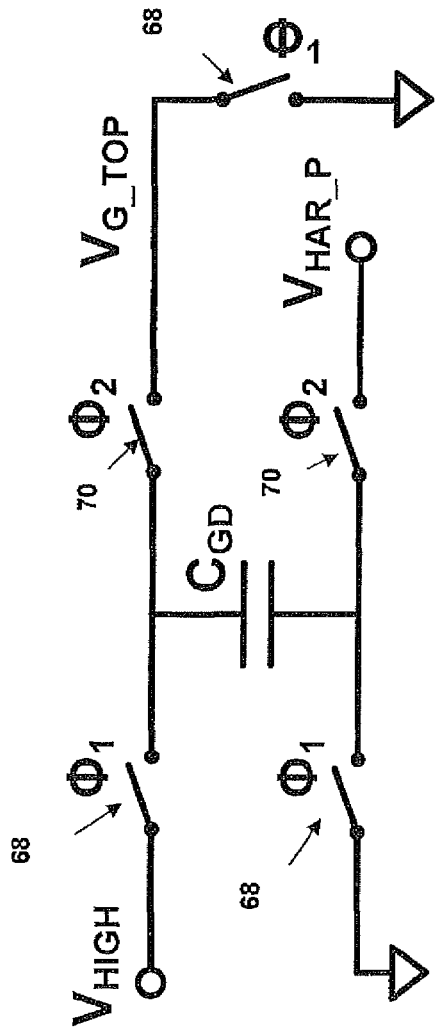
FIGS. 9A-9B are circuit diagrams illustrating a bias-flip switch gate-drive circuitries.
Figure 9B:
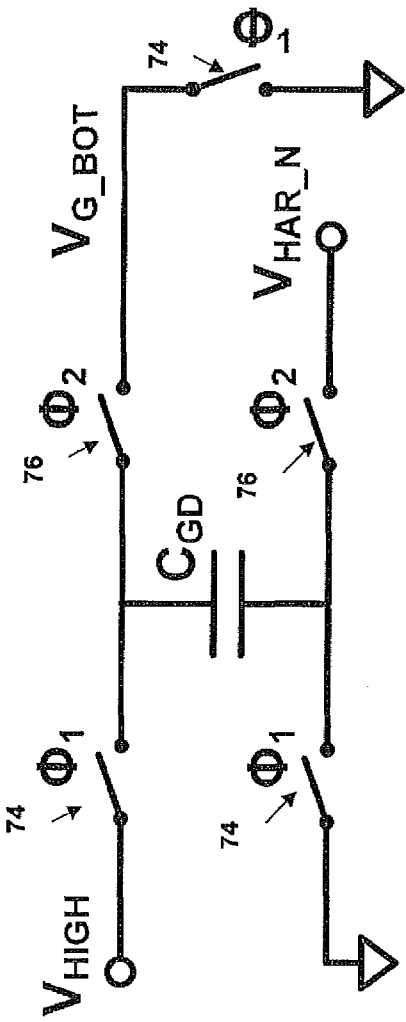

In particular, FIG. 9A shows a circuit 66 that drives the bias flip transistor switch M1 of FIG. 7. The circuit 66 includes switches 68 that are closed at a respective pulse $\Phi_1$, and switches 70 that are closed at a respective state $\Phi_2$. FIG. 9B shows a circuit 70 that drives the bias flip transistor switch M2 of FIG. 7. The circuit 72 includes switches 74 that are closed at a respective pulse phase $\Phi_1$ and switches 76 that are closed at a respective pulse phase $\Phi_2$.

The gate-drive circuitries 66, 72 include a capacitor $C_{GD}$ which can be implemented on-chip. During phase $\Phi_1$ when the bias-flip switches M1 and M2 are OFF, the capacitor $C_{GD}$ gets charged to $V_{HIGH}$ and the gate voltages of both the bias-flip M1 and M2 switches are brought to ground. When $I_P$ crosses zero the bias-flipping takes place, phase $\Phi_2$ begins, where the voltage across $C_{GD}$ remains almost the same, but the voltage referenced to ground at $V_{G\_TOP}$ and $V_{G\_BOT}$ becomes ($V_{HIGH}+V_{HAR\_P}$) and ($V_{HIGH}+V_{HAR\_N}$) respectively. This turns ON the bias-flip switches M1 and M2 and keeps them ON till the flipping of voltage across $C_p$ has taken place. After this, phase $\Phi_2$ ends and the bias-flip switches M1 and M2 are turned OFF. The voltage $V_{HIGH}$ can be obtained using a boost DC-DC converter using the same shared inductor controlled by the arbiter. This simple scheme can be implemented on-chip and prevents the bias-flip switches from breaking down due to high voltage.

Although the present invention has been shown and described with respect to several preferred embodiments thereof, various changes, omissions and additions to the form and detail thereof, may be made therein, without departing from the spirit and scope of the invention.

What is claimed is:

1. An energy harvester circuit comprising:
   a harvesting module for extracting energy from an ambient source;
   a bias flip module for managing the manner in which voltage across said harvesting module transitions when input current to said harvesting module changes direction so as to allow a majority of the charge available from the harvesting module to be extracted; and
   a voltage transitioning module that is shared amongst one or more DC-DC converters for efficient energy management, said voltage transitioning module comprises an inductor mechanism being shared amongst said main DC-DC converter and said one or more secondary DC-DC converters.

2. The energy harvester circuit of claim 1, wherein said one or more DC-DC converters comprising a main DC-DC converter coupled to one or more of secondary DC-DC converters.

3. The energy harvester circuit of claim 1, wherein said inductor mechanism utilizes an arbiter to share inductance with said main DC-DC converter and said one or more secondary DC-DC converters.

4. The energy harvester circuit of claim 1, wherein said voltage transitioning module comprises one or more switches.

5. The energy harvester circuit of claim 1, wherein said bias flip module is coupled to a capacitance at its output.

6. The energy harvester circuit of claim 1, wherein said bias flip module comprises a plurality of diodes.

7. The energy harvester circuit of claim 3, wherein said arbiter receives input signals from said bias flip module and said one or more DC-DC converters as to determining sharing of inductance.

8. The energy harvester circuit of claim 1, wherein said harvesting module comprises a piezoelectric harvester.

9. A method of performing energy harvesting comprising:
   providing a harvesting module for extracting energy from an ambient source;
   implementing a bias flip module for managing the manner in which voltage across said harvesting module transitions when input current to said harvesting module changes direction so as to allow a majority of the charge available from the harvesting module to be extracted; and
   implementing a voltage transitioning module that is shared amongst one or more DC-DC converters for efficient energy management, said voltage transitioning module comprises an inductor mechanism being shared amongst said main DC-DC converter and said one or more secondary DC-DC converters.

10. The method of claim 9, wherein said one or more DC-DC converters comprising a main DC-DC converter coupled to one or more of secondary DC-DC converters.

11. The method of claim 9, wherein said inductor mechanism utilizes an arbiter to share inductance with said main DC-DC converter and said one or more secondary DC-DC converters.

12. The method of claim 9, wherein said voltage transitioning module comprises one or more switches.

13. The method of claim 9, wherein said bias flip module is coupled to a capacitance at its output.

14. The method of claim 9, wherein said bias flip module comprises a plurality of diodes.

15. The method of claim 11, wherein said arbiter receives input signals from said bias flip module and said one or more DC-DC converters as to determining sharing of inductance.

16. The method of claim 9, wherein said harvesting module comprises a piezoelectric harvester.

* * * * *